United States Patent
MC Nutt et al.

(10) Patent No.: US 6,418,259 B2
(45) Date of Patent: *Jul. 9, 2002

(54) OPTICAL CONDUCTOR AND ITS METHOD OF MANUFACTURE

(75) Inventors: Christopher MC Nutt, Hickory, NC (US); Valérie Boncompain, Andresy (FR)

(73) Assignee: Alcatel Cable France, Clichy Cedex (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 110 days.

(21) Appl. No.: 08/928,658

(22) Filed: Sep. 12, 1997

(30) Foreign Application Priority Data

Sep. 13, 1996 (FR) .............................. 96 11197

(51) Int. Cl.⁷ .................................................. G02B 6/02
(52) U.S. Cl. ........................................ 385/128; 385/123
(58) Field of Search .............................. 385/128, 126, 385/127, 123, 114; 524/195, 102; 427/156; 430/611, 605, 567, 569; 525/194, 199

(56) References Cited

U.S. PATENT DOCUMENTS

| | | | | |
|---|---|---|---|---|
| 4,877,306 A | * | 10/1989 | Kar | 385/128 |
| 5,253,318 A | * | 10/1993 | Sayegh et al. | 385/114 |
| 5,621,031 A | * | 4/1997 | Leimann et al. | 524/195 |
| 5,644,670 A | * | 7/1997 | Fukuda et al. | 385/124 |

FOREIGN PATENT DOCUMENTS

WO  WO 96/08524  * 3/1996

* cited by examiner

Primary Examiner—Ellen E. Kim
(74) Attorney, Agent, or Firm—Sughrue Mion, PLLC

(57) ABSTRACT

An optical conductor comprises a fiber, in particular a glass fiber, surrounded by a protective polymer material of the UV-curable type. The protective polymer material contains a water-absorbing additive, preferably a carbodiimide, a poly-carbodiimide, or a polyurea. When the additive is based on carbodiimide, it opposes photodegradation.

13 Claims, 3 Drawing Sheets

OPTICAL CONDUCTOR AND ITS METHOD OF MANUFACTURE

The invention relates to an optical conductor comprising a fiber, in particular a glass fiber, surrounded by a protective polymer material.

BACKGROUND OF THE INVENTION

Optical fiber cables are being used more and more commonly for signal transmission, in particular for telecommunications, because of the large passband and the low sensitivity to noise of optical transmission.

Optical conductors are often disposed in a hostile environment. In particular, optical conductors are subjected to moisture and to large temperature variations.

It has been observed that the polymer resins of optical conductors subjected to a hostile environment, in particular a moist environment, are subject to degradation which makes the polymers brittle, leading to the glass fiber becoming stripped and even, in extreme cases, to the conductor breaking.

These defects come from hydrolysis, which causes the molecules of the polymer to separate under the influence of water and which thus modifies the physical properties of the material.

Until now, in order to limit the consequences of moisture, precautionary measures have been multiplied, for example by surrounding the conductor or the set of conductors with a compound such as grease. Another precaution consists in using this type of conductor only at temperatures of not more than 70° C.

Protective measures are expensive and not always effective. In addition, the 70° C. limit is constricting.

OBJECT AND BRIEF SUMMARY OF THE INVENTION

The invention seeks to remedy those drawbacks.

According to the invention the polymer material(s) surrounding the conductive optical fiber, which material(s) is/are of the UV-cured type, contain(s) a water-absorbing additive, in particular a carbodiimide, a poly-carbodiimide, or a polyurea.

To manufacture an optical conductor or ribbon of the invention, the moisture-absorbing additive is incorporated into the polymer resin before it is cured by ultraviolet radiation.

It has been observed that exposure to ultraviolet radiation for curing purposes does not modify the moisture-absorbing properties of the additives. In particular, a mono- or a poly-carbodiimide or a polyurea compound retains its absorption properties.

The action of absorbing water can take place in various ways. For example, the water can form a polymer structure that spoils the physical properties of the resin very little or not at all. If a polyurea compound is used, the polymer formed may be a polyurethane. In other words, the resin is not decomposed by absorbing water.

Tests have shown that the protection provided by the additive increases with the content thereof in the resin. Best results have been obtained for a content of 5% by weight of additive; nevertheless, for reasons of cost, it is preferable not to exceed the value of 5%. The preferred range is 1% to 5% by weight.

The invention also applies to a ribbon, i.e. to a set of optical conductors assembled together in parallel.

It has also been observed that at least some additives added to the polymer material surrounding the optical fiber have an additional beneficial effect of opposing photolysis or photodegradation, i.e. degradation of the polymer during prolonged exposure to light. Usually, such photodegradation gives rise firstly to the polymer resin yellowing, and secondly to the physical properties of the resin being spoilt. A carbodiimide type additive is effective in opposing photodegradation. Best results have been obtained when the carbodiimide content is of the order of 1.5% by weight.

Thus, the invention also relates to an optical conductor comprising a fiber, in particular a glass fiber, surrounded by a protective polymer material of the UV-curable type, and wherein the protective polymer material contains a carbodiimide-based additive that preferably opposes photodegradation.

BRIEF DESCRIPTION OF THE DRAWINGS

Other characteristics and advantages of the invention appear from the description of certain embodiments given with reference to the accompanying drawings, in which.

MORE DETAILED DESCRIPTION

Figure 1:
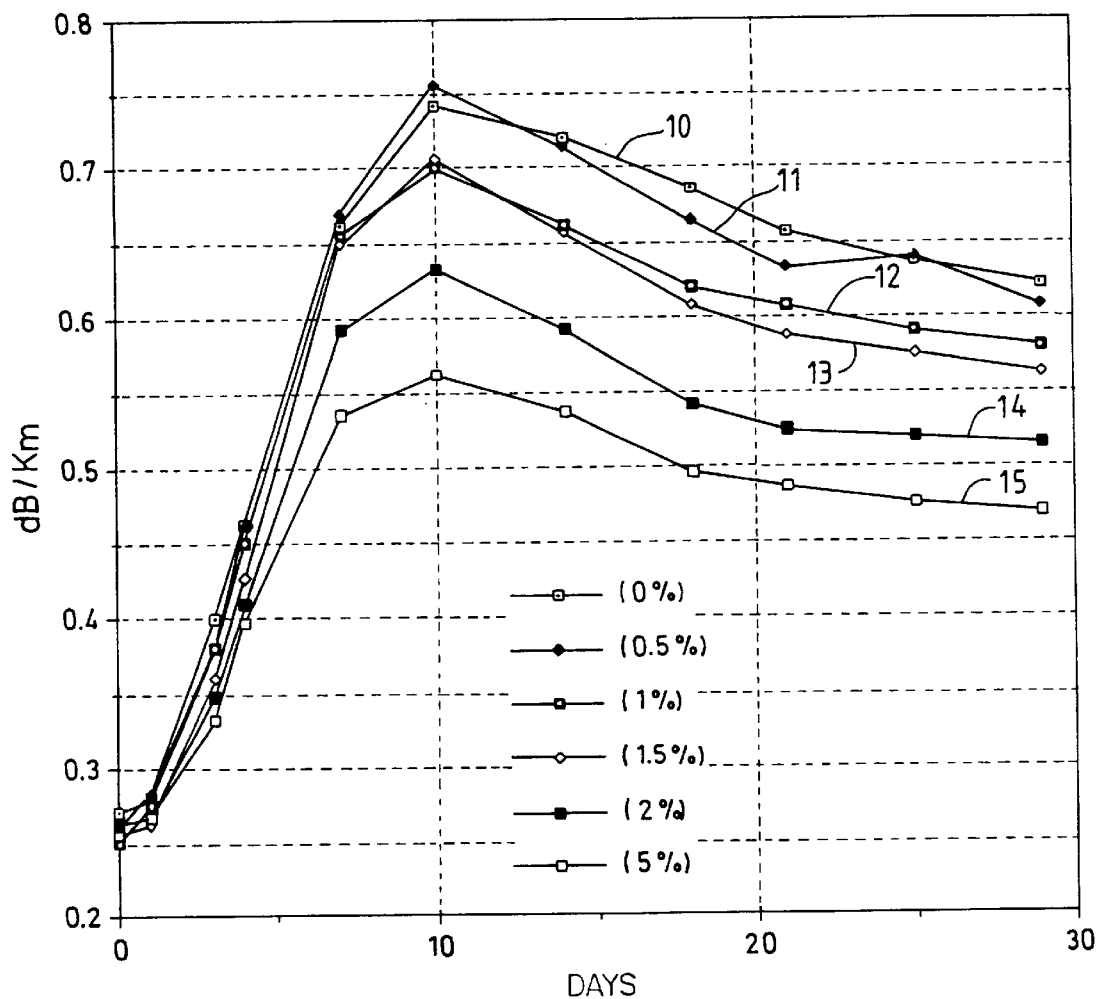
FIGS. 1 and 2 are graphs showing the effect of moisture as a function of time on the transmission quality of an optical fiber at various concentrations of additive in the resin of the sheath surrounding the optical fiber.

FIG. 1 shows the results of tests performed on optical fibers into which light was injected at a wavelength of 1550 nanometers (nm).

FIG. 1 is a graph showing how the attenuation of the optical fiber (expressed in dB/km and plotted up the ordinate) varies as a function of time (expressed in days and plotted along the abscissa). The tests were performed at six different concentrations of additive.

In all cases, testing was performed on a ribbon of four optical conductors immersed in water at a temperature of 60° C. The resin used was that referenced 9-75 from DSM to which there was added the carbodiimide additive known as "stabaxol 1" from Rhein-Chemie.

Curve 10 corresponds to a polymer resin having no additive. Curve 11 corresponds to a polymer resin with 0.5% additive. Curve 12 relates to additive at a concentration of 1%. Curve 13 to a concentration of 1.5%, and curves 14 and 15 to concentrations of 2% and 5%, respectively.

In all cases, attenuation increases to reach its maximum after about ten days, and then decreases until it stabilizes after about 30 days. It can be seen that attenuation decreases with increasing additive content. Although curve 15 corresponds to best results, it is nevertheless preferable, for reasons of cost, to use additive at a concentration of about 2% by weight, which corresponds to curve 14.

Figure 2:
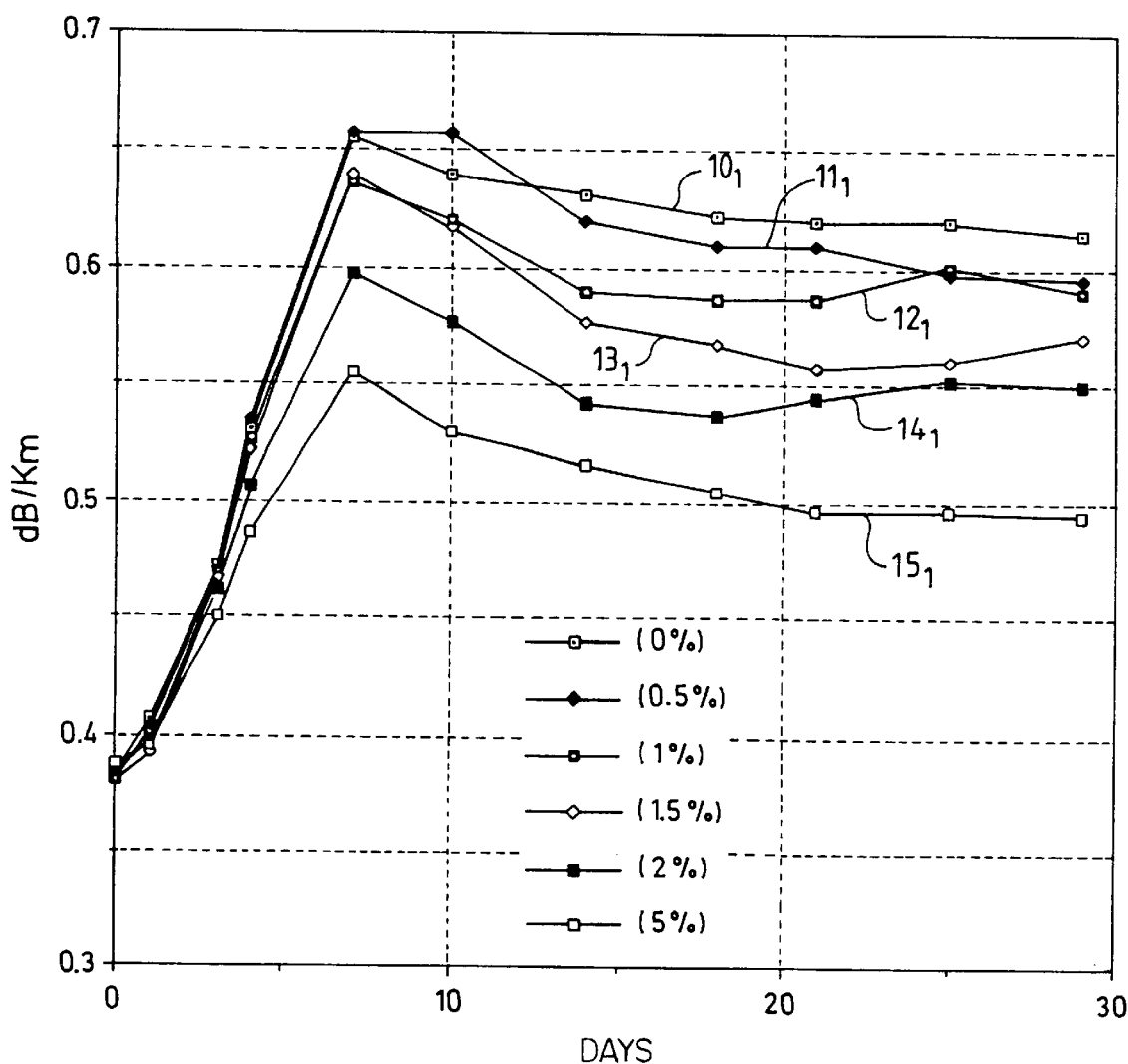

FIG. 2 is a graph of a test performed under exactly the same conditions as those of FIG. 1, but while injecting light at a wavelength of about 1300 nm. Curves $10_1$, $11_1$, $12_1$, $13_1$, $14_1$, and $15_1$ correspond to the same additive contents, i.e. to 0%, 0.5%, 1%, 1.5%, 2%, and 5%, respectively.

The results obtained are similar to those of FIG. 1.

It should be observed that carbodiimides absorb not only water, but also acids, and in both cases they transform them into ureas.

Figure 3:
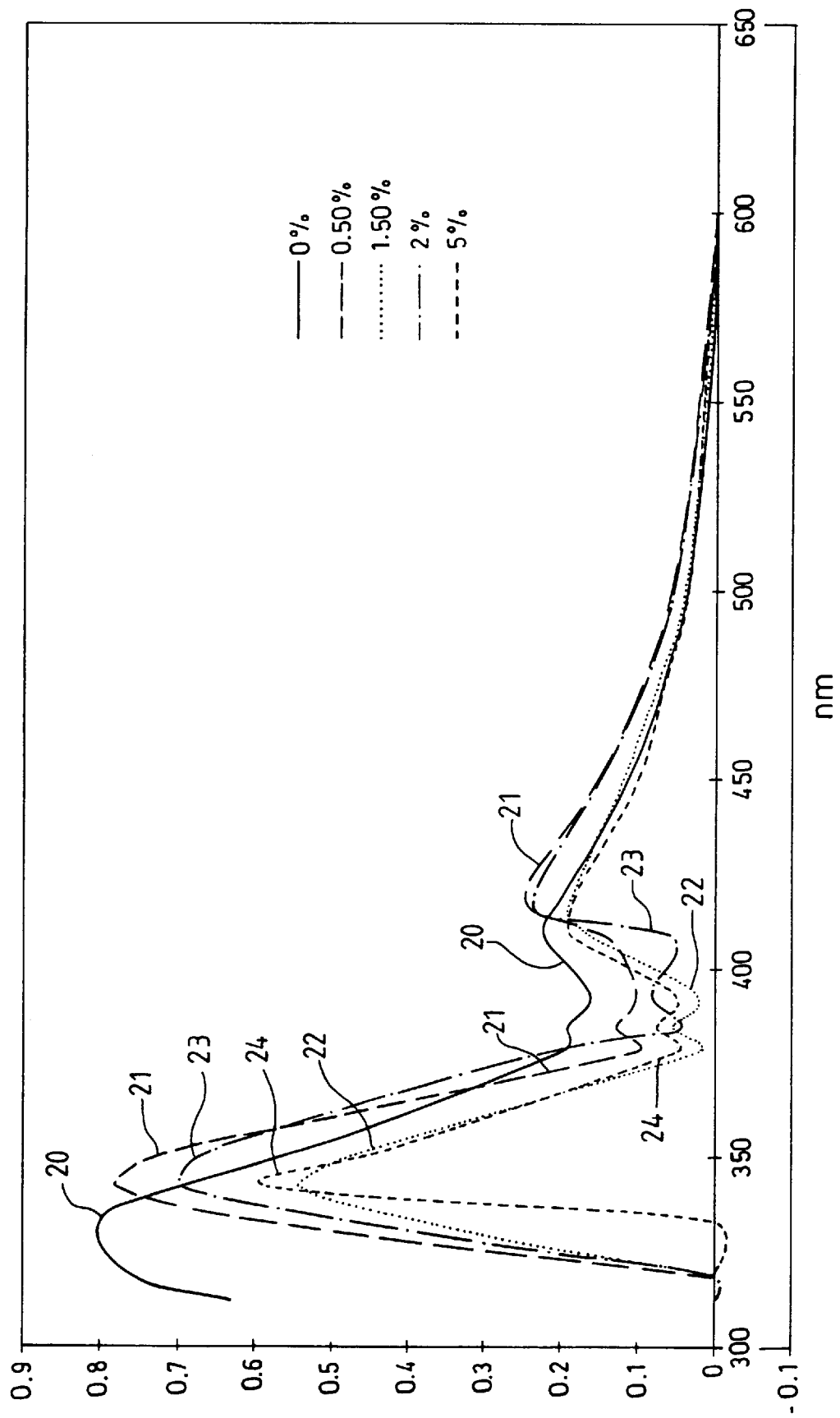
FIG. 3 is a graph showing how light absorption varies as a function of wavelength, after aging, in a resin containing an additive of the carbodiimide type.

With reference to the graph of FIG. 3, there follows a description of other aging tests performed on the same resin referenced 9-75 from DSM to which there had been added the carbodiimide additive "stabaxol 1" from Rhein-Chemie.

In this graph, each curve represents the light absorption spectrum of said ultraviolet-cured polymer resin, with each curve corresponding to a specific concentration of additive, as specified below. The curves were obtained using samples in the form of films. Each sample was subjected to accelerated aging consisting in exposure to UV radiation in an oven at a temperature of 50° C. for 251 hours.

Absorbance, expressed in relative values, is plotted up the ordinate, and wavelength expressed in nanometers (nm) is plotted along the abscissa. The wavelength lies in the range 310 nm to 600 nm which corresponds to the ultraviolet and to the visible.

Curve 20 corresponds to a polymer resin having no additive, curve 21 to a polymer resin having 0.5% additive, curve 22 to 1.5% additive, curve 23 to 2% additive, and curve 24 to 5% additive.

Each of the curves has two absorbance maxima, one at about 336 nm and the other at about 414 nm.

The amplitude of the maximum or peak at 336 nm represents the main photodegradation, i.e. the quantity of peroxide radicals in the resin. The greater the amplitude of this peak, the greater the content of peroxide radicals in the resin.

It can thus be seen that it is curve 20 (corresponding to resin without any additive) which has the highest absorbance maximum at 336 nm, while the other curves 21 to 24, which correspond to resins having stabaxol added thereto, have lower maxima at the same wavelength.

It will also be observed that the 336 nm peak is lowest for a content of about 1.5% by weight (curve 22).

As mentioned above, degradation under the effect of light as a function of time gives rise firstly to the physical properties of the resin becoming spoilt, i.e. the resin becomes much more brittle, and secondly by the surface thereof yellowing. This surface yellowing is represented by the peak at 414 nm. This absorption peak at 414 nm corresponds to a violet indigo color; the human eye therefore perceives the complementary color, i.e. yellow/green. The greater the multitude of this maximum, the greater the amount of yellowing. In this case also, it can be seen that the best results are obtained (i.e. the peak is of smallest amplitude) for an additive content of about 1.5%.

What is claimed is:

1. An optical conductor comprising a fiber, in particular a glass fiber, surrounded by a protective UV cured polymer material, wherein after UV-curing the protective UV cured polymer material comprises a water-absorbing additive.

2. An optical conductor according to claim 1, wherein the additive is a carbodiimide or a poly-carbodiimide.

3. A conductor according to claim 1, wherein the additive is a polyurea.

4. A conductor according to claim 1, wherein the content of additive in the polymer material is not more than 5% by weight.

5. An optical conductor according to claim 4, wherein the content of additive is about 2% by weight.

6. A method of manufacturing an optical conductor according to claim 1, wherein the additive is mixed with the resin prior to UV-curing.

7. An optical conductor ribbon in which each conductor is a conductor according to claim 1.

8. An optical conductor comprising a fiber, in particular a glass fiber, surrounded by a protective UV cured polymer material, wherein after UV-curing the protective UV cured polymer material comprises a carbodiimide additive.

9. An optical conductor according to claim 8, wherein the carbodiimide content is of the order of 1.5% by weight.

10. An optical conductor comprising a fiber, in particular a glass fiber, surrounded by a protective UV cured polymer material, wherein after UV-curing the protective UV cured polymer material comprises a photodegrdation opposing carbodiimide additive.

11. An optical conductor according to claim 10, wherein the additive content is not greater than 5% by weight, and is preferably of the order of 1.5% by weight.

12. An optical conductor ribbon comprising a plurality of conductors assembled in parallel, wherein each conductor includes a fiber surrounded by a protective UV cured polymer material, wherein after UV-curing said protective UV cured polymer material comprises a water-absorbing additive.

13. The ribbon of claim 12, wherein said additive is a carbodiimide or a poly-carbodiimide.

* * * * *